United States Patent [19]

del Ser Gonzalez

[11] 4,182,233

[45] Jan. 8, 1980

[54] STUFFING APPARATUS UTILIZING A MAGAZINE

[76] Inventor: Clemente del Ser Gonzalez, Pasco Talleres No. 36, Villaverde Alto, Spain

[21] Appl. No.: 774,886

[22] Filed: Mar. 7, 1977

Related U.S. Application Data

[63] Continuation-in-part of Ser. No. 567,811, Apr. 15, 1975, Pat. No. 4,096,794.

[30] Foreign Application Priority Data

Oct. 28, 1974 [ES] Spain .................................. 431.436

[51] Int. Cl.² ........................... A23N 4/08; A23P 1/00
[52] U.S. Cl. ........................................ 99/494; 99/561; 29/809
[58] Field of Search .......... 99/387, 494, 548, 559–561; 269/69; 17/38; 270/68 R; 29/809; 221/88, 89

[56] References Cited

U.S. PATENT DOCUMENTS

| | | | |
|---|---|---|---|
| 1,831,429 | 11/1931 | Swearingen | 221/88 |
| 2,567,590 | 9/1951 | Ashlock | 99/494 |
| 2,597,933 | 5/1952 | Hungate | 99/494 |
| 3,556,743 | 1/1971 | Yeager | 29/809 |
| 3,772,982 | 11/1973 | Smith | 99/494 |

Primary Examiner—Harvey C. Hornsby
Assistant Examiner—Timothy F. Simone
Attorney, Agent, or Firm—Huebner & Worrel

[57] ABSTRACT

A stuffing apparatus for a machine having a stuffing station and adapted successively to deliver objects, having cavities to be stuffed, to the stuffing station, the apparatus having a magazine housing individual segments of stuffing material; a plunger assembly borne by the machine for movement along a path of travel through the magazine to drive one of the segments from the magazine and into the cavity of an object in the stuffing station; and a mechanism for synchronously indexing the magazine transversely of the path of travel of the plunger assembly to position one of the segments in the path prior to each movement of the plunger assembly.

8 Claims, 10 Drawing Figures

STUFFING APPARATUS UTILIZING A MAGAZINE

CROSS-REFERENCE TO RELATED APPLICATIONS

This application is a continuation-in-part of my co-pending U.S. Patent Application, Ser. No. 567,811, filed Apr. 15, 1975, U.S. Pat. No. 4,096,794, entitled Machine To Remove Pits And Stuff Olives claiming the priority of my Spanish Patent Application No. 431,436, filed Oct. 28, 1974.

BACKGROUND OF THE INVENTION

1. Field of the Invention

The present invention relates to a stuffing apparatus utilizing a magazine and more particularly to such a stuffing apparatus which operates automatically and dependably to stuff objects, such as olives, with a stuffing material, such as pimento, and further which operates with a speed and precision particularly well suited to the commercial production of stuffed olives.

2. Description of the Prior Art

The prior art contains a host of devices related to the coring and/or stuffing of objects, such as olives, on a commercial basis. These devices, and particularly those relating to the stuffing of olives with pimento, have been plagued with such difficulties as handling a flowable mass of stuffing material, separating the material into discrete portions suitable for stuffing, aligning each portion of material with the object to be stuffed, manipulating the cavity of the object to be stuffed for receipt of the portion of material and finally injecting the portion of material into the cavity without loss of the material, damage to the object, or jamming of the device.

Because of these and other difficulties attendant to the stuffing of olives and the like, prior art devices have proved less than completely satisfactory. They are often temperamental in operation, subject to frequent breakdown, in need of periodic adjustment and often become inoperative as a result of accumulated residue from the stuffing material which jams the operative components. The down time resulting from these problems constitutes a considerable drain on an otherwise efficient commercial operation.

Therefore, it has long been known and recognized that it would be desirable to have a stuffing apparatus having particular utility in the commercial stuffing of olives which is extremely rapid, dependable and efficient; which produces finished products of high quality and pleasing market appearance; and which is not subject to the many difficulties inherent in the use of devices heretofore known in the industry.

SUMMARY OF THE INVENTION

Therefore, it is an object of the present invention to provide an improved stuffing apparatus utilizing a magazine.

Another object is to provide such an apparatus which operates automatically to handle stuffing material in a stuffing machine with a precision and dependability never before achieved in the art.

Another object is to provide such an apparatus which achieves its dependability of operation from a simplicity of structure.

Another object is to provide such an apparatus which can simply and dependably be loaded and operated by an operator with a minimum of training.

Another object is to provide such an apparatus which operates at extremely high speed and has particular utility in the commercial stuffing of olives.

Another object is to provide such an apparatus which utilizes magazines which are loaded with stuffing material by being pressed downwardly on a mat of such stuffing material individually to load compartments in the magazine.

Another object is to provide such an apparatus which utilizes a plurality of magazines stacked endwardly in a loading frame to permit operation of the apparatus to continue without interruption by simply continuing to deposit loaded magazines in the frame.

Another object is to provide such an apparatus which operates to fold segments of stuffing material immediately prior to insertion into the olive and which folds the segment in relation to its direction of insertion so that the exterior surface of the stuffing material presents a smooth, pleasing appearance after the stuffing operation has been completed.

Another object is to provide such an apparatus which utilizes a plunger assembly, folding member, and indexing fingers linked in a unique way so as to sequence the respective operations thereof in a highly simplified manner.

A further object is to provide such an apparatus which can be operated with little maintenance over a long operational life with little or no breakdown.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 1:
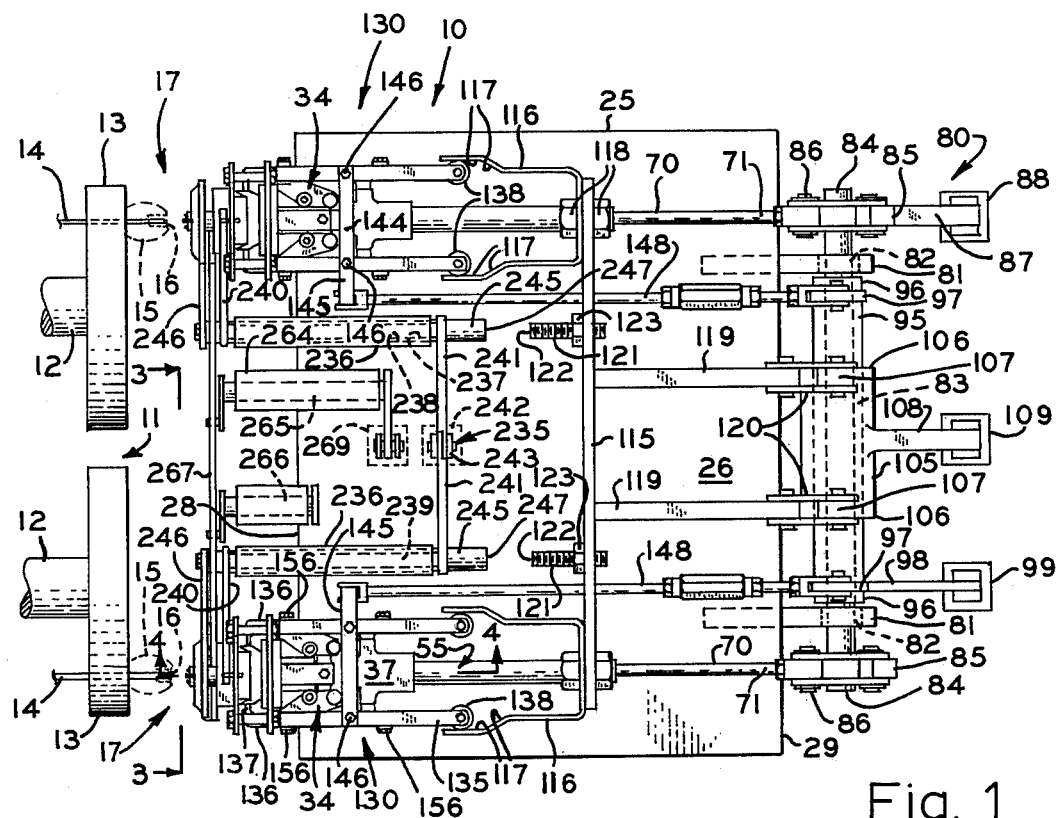
FIG. 1 is a fragmentary top plan view of a typical olive pitting and stuffing machine illustrative of a suitable operational environment for the stuffing apparatus of the present invention shown therein.

Referring more particularly to the drawings, FIG. 1 shows the stuffing apparatus of the present invention generally at 10. The stuffing apparatus is adapted to be mounted on and compose an operative part of a wide variety of stuffing machines and is particularly well suited to use on olive pitting and stuffing machines. The Drake U.S. Pat. No. 2,246,843 and the Francisco U.S. Pat. No. 2,681,089 disclose such machines and may be referred to for details regarding the orienting, pitting and delivery of olives to a stuffing station as well as the mechanisms used in sequencing these operations. These operations constitute no part of the present invention and so are not described or claimed herein.

For purposes of illustrating the operation of the stuffing apparatus 10, it will be understood that the stuffing apparatus 10 is mounted on and operated as an integral part of a suitable pitting machine 11. The pitting machine has a pair of drive shafts 12 adapted to be rotated by the machine in increments of stepped progression. An index wheel 13 is borne by each drive shaft for movement therewith. A plurality of punch assemblies 14 are extended through each index wheel and adapted to be extended and retracted in sequence for the pitting of each olive, the transferring of each olive to a position for stuffing and the releasing of each olive subsequent to stuffing. For illustrative convenience, an olive is indicated at 15 having a cavity 16. Each index wheel is adapted to transport each successive punch assembly, bearing an olive, to a stuffing station 17 whereupon the operations of the stuffing apparatus of the present invention are performed.

The stuffing apparatus 10 has a base plate 25. The base plate has an upper surface 26 and a lower surface 27. The base plate has a forward edge 28 disposed in proximity to the stuffing station 17 and an opposite rearward edge 29. The base plate is mounted on the pitting machine 11 on suitable upright supports 30.

Figure 2:
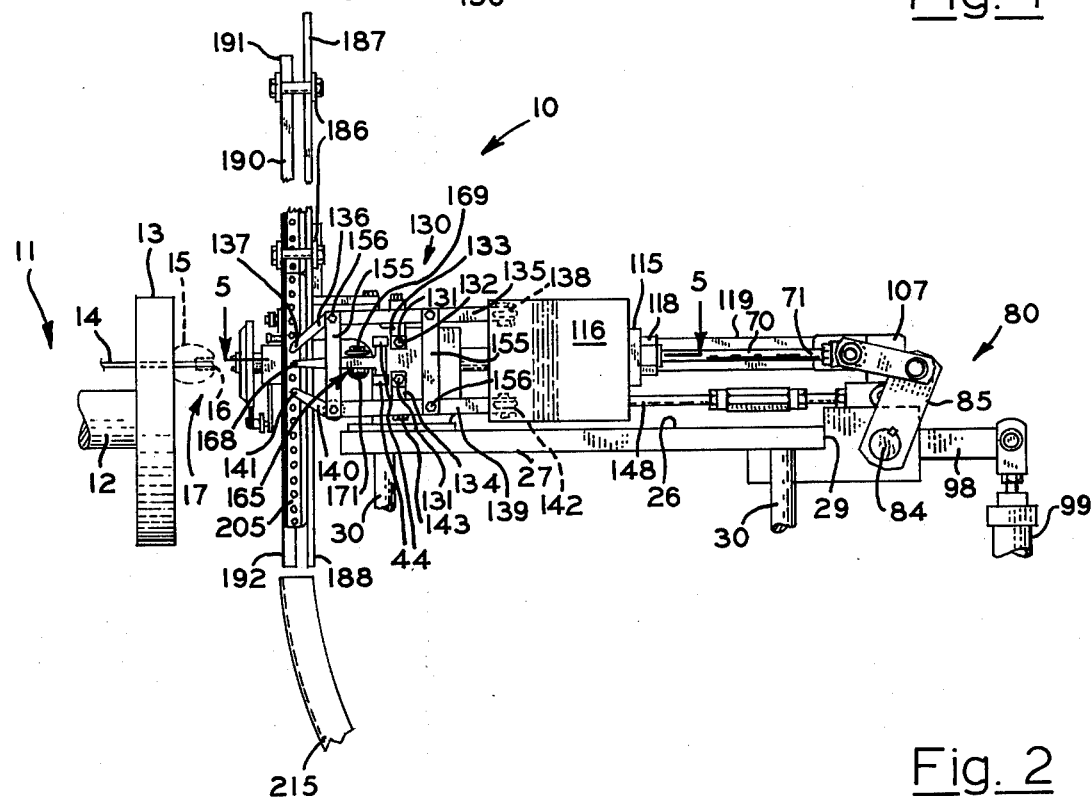
FIG. 2 is a fragmentary side elevation of the stuffing machine viewed in FIG. 1.
Figure 4:
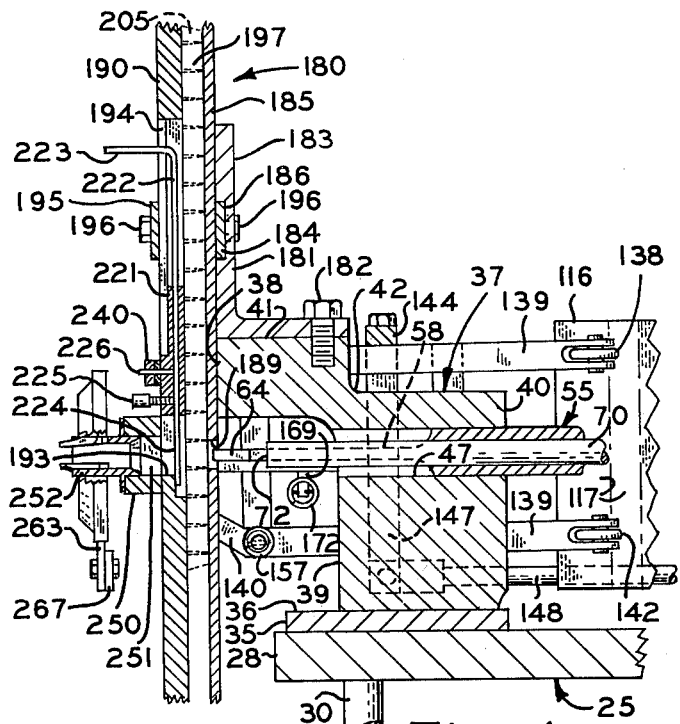
FIG. 4 is a somewhat enlarged, fragmentary vertical section taken on line 4—4 in FIG. 3.
Figure 5:
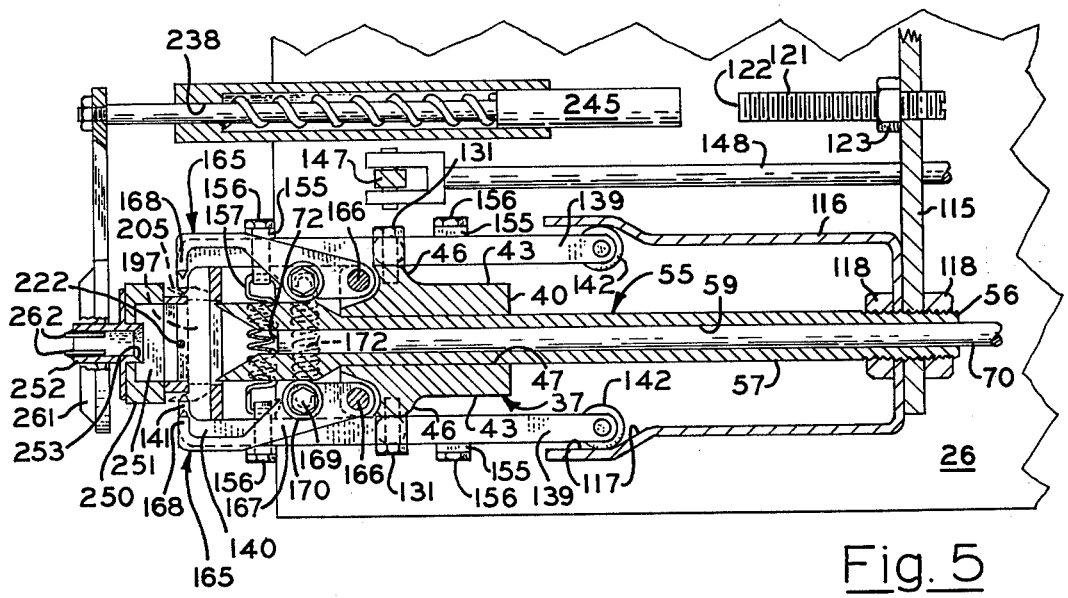
FIG. 5 is a somewhat enlarged, fragmentary horizontal section taken on line 5—5 in FIG. 2.
Figure 6:
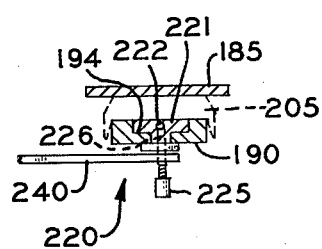
FIG. 6 is a horizontal section taken on line 6—6 in FIG. 3.

The stuffing apparatus 10 of the preferred embodiment of the present invention has a pair of stuffing units 34 individually mounted in side-by-side relation on the upper surface 26 of the base plate 25. Each stuffing unit is individually aligned with one of the index wheels 13 of the pitting machine 11 immediately opposite its respective stuffing station 17. Each stuffing unit has a mounting plate 35, having an upper surface 36, secured on the upper surface 26 of the base plate 25 immediately adjacent to the forward edge 28 of the base plate. A feed housing 37 is affixed in upright relation on the upper surface of each mounting plate 35. Each feed housing has a forward surface 38 which faces its respective stuffing station 17. The feed housing has a recess 39 extending from the forward surface inwardly of the housing and downwardly to the mounting plate 35, as best shown in FIG. 4. The feed housing has a rearward surface 40 and an upper surface 41. A recess 42 extends downwardly from the upper surface and rearwardly to join the rearward surface of the feed housing. The feed housing has opposite sides 43. A pair of vertically aligned bosses 44 extend outwardly from each opposite side of the feed housing in spaced, substantially parallel relation. A recess 45 is provided in each opposite side between the bosses of each pair. A pair of projections 46 are extended outwardly from each opposite side 43 of the feed housing 37, as best shown in FIGS. 2 and 5. A cylindrical guide passage 47 extends longitudinally through the feed housing from the rearward surface 40 thereof into communication with the recess 39, as best shown in FIG. 4. The guide passage is axially aligned with a punch assembly 14 which is disposed in its respective stuffing station 17 of the pitting machine 11.

Each stuffing unit 34 has a folding member 55 received for slidable movement within the guide passage 47 of its respective feed housing 37. The folding member has a screwthreaded portion 56 remote from the stuffing station 17, a cylindrical portion 57 which is adapted for slidable movement within the guide passage 47 and a flattened or forked portion 58 extending outwardly from the guide passage into the recess 39 of the feed housing and toward the stuffing station. The folding member has a longitudinal passage 59, which is concentric to the guide passage, extending axially through the folding member from the screwthreaded end portion outwardly through the forked portion thereof.

The forked portion 58 of the folding member 55 is composed of a pair of prongs 60 disposed in juxtaposition on opposite sides of the passage 59. Each prong has a flared portion 61 extending laterally of the prong to define a flared cam surface 62 of predetermined configuration, as shown in FIG. 5. The flared cam surface of each prong leads rearwardly in the direction of the cylindrical portion 57 of the folding member to define a recessed cam surface 63. The flared portion of each prong has oblique folding surface 64 which extends rearwardly and toward the passage 59 of the folding member. Each folding member is received in its respective guide passage 47 for slidable movement between a retracted position shown in FIGS. 4 and 5 and an extended position shown in FIG. 7.

A plunger or plunger assembly 70 is slidably received within the longitudinal passage 59 of each folding member 55. Each plunger has a drive end portion 71 extended rearwardly out of the screwthreaded end portion 56 of the folding member and an opposite work end 72. The work end is slidable within the longitudinal passage 59 of the folding member and can be moved between a retracted position shown in FIGS. 4 and 5 and an extended or advanced position hereinafter to be described. The folding member and plunger are thus received for coaxial reciprocal movement along the predetermined path or axis defined by the guide passage 47.

The stuffing apparatus 10 has a drive assembly 80 for the pair of stuffing units 34, shown in FIGS. 1 and 2. The drive assembly has a pair of mounts 81 secured on the base plate 25 extending rearwardly from its rearward edge 29. Each of the mounts has a bearing 82 secured therein with the bearings of the respective mounts defining an axis of rotation substantially parallel to the rearward edge 29 of the base plate. A main shaft 83 is rotationally received in the bearings 82 and has opposite ends 84 individually extending laterally of the mounts, as best shown in FIG. 1. A lever arm 85 is affixed on each opposite end of the main shaft in corresponding predetermined positions, as shown in FIG. 2, for pivotal movement with the shaft. A linkage 86 interconnects the remote end of each lever arm and the drive end portion 71 of its respective adjacent plunger 70. The uppermost lever arm 85, as shown in FIG. 1, mounts a connecting arm 87 which is extended therefrom in substantially right-angular relation to the lever arm 85. A hydraulic cylinder assembly 88 is connected to the remote end of the connecting arm. The hydraulic cylinder assembly is operable through a suitable sequencing mechanism, not shown, for the stuffing apparatus and pitting machine 11 to rotate the main shaft so as simultaneously to transport the plungers 70 of the respective stuffing units 34 between their respective retracted and advanced positions.

An elongated sleeve 95 is received for rotational movement on and about the main shaft 83 between the opposite ends 84 of the main shaft. The elongated sleeve has opposite ends 96. A pair of lever arms 97 are borne by the elongated sleeve individually adjacent to the opposite ends thereof and extending upwardly in corresponding positions. A connecting arm 98 is affixed on the lowermost lever arm 97, as viewed in FIG. 1, and extends rearwardly therefrom at substantially right angles to the lever arm. A hydraulic cylinder assembly 99 is borne by the pitting machine 11 and operably connected to the connecting arm 98. Hydraulic cylinder assembly 99 is adapted to be operated by the sequencing mechanism, not shown, for simultaneous operation of corresponding portions of the stuffing units 34 hereinafter to be described.

An outer sleeve 105 is rotationally received on and about the elongated sleeve 95 between the opposite ends 96 of sleeve 95, as best shown in FIG. 1. The outer sleeve has opposite ends 106. A pair of lever arms 107 are secured on the outer sleeve individually adjacent to the opposite ends thereof and extend upwardly in corresponding positions for pivotal movement with the outer sleeve. A connecting arm 108 is fastened on the outer sleeve and is extended rearwardly from the sleeve in substantially right-angular relation to the lever arms 107. A hydraulic cylinder assembly 109 is borne by the pitting machine 11 and operably connected to the connecting arm 108. The hydraulic cylinder assembly 109 is adapted to be operated by the sequencing mechanism, not shown, to rotate the outer sleeve for purposes hereinafter to be described.

A cross bar 115 is received on the screwthreaded end portions 56 of the folding members 55 extending in right-angular relation therebetween. A pair of return bent cam plates 116 are individually received on the screwthreaded end portions 56 in engagement with the cross bar. The cam plates extend from the cross bar in the direction of their respective stuffing units 34. Each cam plate has a pair of facing cam surfaces 117 which are stepped inwardly at corresponding predetermined positions, as best shown in FIG. 5. A pair of nuts 118 are screwthreadably secured on the screwthreaded end portion 56 of each folding member on opposite sides of the cam plate and cross bar to lock them in position, as shown in FIG. 5. A pair of connecting arms 119 are affixed on the cross bar and extend rearwardly therefrom in alignment with the lever arms 107 of the outer sleeve 105. A pair of linkages 120 individually interconnect the connecting arms 119 and their respective lever arms 107. It will be seen that movement of the hydraulic cylinder assembly 109 operates simultaneously to impart movement to the folding members 55 of the respective stuffing units 34 between the retracted and advanced positions previously identified. Similarly, such movement causes the cam surfaces 117 of the cam plates 116 to be transported with their respective folding members.

A pair of adjustment members 121 are screwthreadably mounted on the cross bar in predetermined spaced relation, as best shown in FIG. 1. Each adjustment member has a stop end 122 nearest its respective stuffing station and is adjustably mounted in position on the cross bar by means of a lock nut 123.

Each of the stuffing units 34 has an indexing mechanism or cage assembly 130 mounted thereabout. A pivot pin 131 is mounted on each of the four projections 46 of each stuffing unit. A pivot member 132 is pivotally mounted on each pin 131. A pair of upwardly extending shafts 133 are individually mounted on the pivot members 132 of the uppermost pivot pins 131 on the opposite sides 43 of each feed housing 37. A pair of downwardly extending shafts 134 are individually mounted on the pivot members 132 of the lowermost pivot pins 131 on the opposite sides of each feed housing. A pair of upper cage members 135 are individually pivotally mounted on the upwardly extending shafts 133. It will be seen that each shaft 133 is thus pivotal about the horizontal axis defined by its respective pivot pin and each upper cage member 135 is pivotal about the vertical axis defined by its respective shaft 133. The upper cage members individually mount first holding member or upper index or control fingers 136 which extend downwardly and forwardly therefrom, as best shown in FIG. 2. The control fingers have remote ends 137 which are hooked toward each other in substantially right-angular relation to the axis of the guide passage 47. Each upper cage member 135 has a cam follower 138 at the end thereof remote from its control finger and engages one of the cam surfaces 117 of the cam plate 116, as best shown in FIG. 5.

A pair of lower cage members 139 are individually pivotally mounted on the downwardly extending shafts 134 of the cage assembly. Each lower cage member has a first holding member or lower index control finger 140 which extends forwardly and upwardly to a predetermined position and is then bent inwardly to form a hooked remote end 141. The remote ends 141 of the lower control fingers 140 are aligned in substantially right-angular relation to the axis of the guide passage 147. Each lower cage member 139 has a cam follower 142 at the end thereof opposite the control finger 140. Each cam follower is in individual engagement with a predetermined one of the cam surfaces 117 of the cam plate 116. The lower cage members 139 are retained in position on their respective downwardly extending shafts 134 by lower lock nuts 143 which are individually secured on the ends of the shafts 134. A cross piece 144 is borne by the upwardly extending shafts 133 so as to interconnect the upper cage members 135. The cross piece has an extended portion 145 which extends toward the corresponding extended portion of the cross piece of the other stuffing unit 34, as best shown in FIG. 1. A pair of upper lock nuts 146 are secured on the outer ends of the upwardly extending shafts 133 to retain the upper cage members 135 in pivotal mounting on the shafts 133. Similarly, the lock nuts retain the cross piece 144 in position while permitting pivotal movement of the upper cage members relative to the cross piece. A lever arm 147 is mounted on and extended downwardly from the extended portion 145 of each cross piece in substantially right-angular relation thereto. An adjustable linking assembly 148 operably interconnects the remote, downwardly extending end of each lever arm 147 and the remote end of its respective one of the lever arms 97 borne by the elongated sleeve 95.

A pair of vertical pieces 155 interconnect the upper and lower cage members 135 and 139 respectively on each side of each feed housing 37. The vertical pieces are mounted in position on the cage members by pivot pins 156 which permit limited pivotal movement between each vertical piece and its respective cage members 135 and 139. A tension spring 157 interconnects the lowermost pivot pins 156 adjacent to the lower control fingers 140 to retain the cam followers 138 and 142 in engagement with the cam surfaces 117 of their respective cam plates 116. Thus, it will be seen that the cage members 135 and 139 on opposite sides of the feed housing are pivoted about the shafts 133 and 134 upon movement of the cam plate 116. This action causes the control fingers 136 and 140 on opposite sides of the feed housing to be pivoted to or from each other. More specifically, when the hydraulic cylinder assembly 109 is operated to move the cam plates 116 to the left, as viewed in FIG. 1, the cage members are pivoted so as to move the control fingers from each other. Conversely, if the hydraulic cylinder is operated to move the cam plates 116 to the right, as viewed in FIG. 1, the spring 157 draws the control fingers toward each other to the extent permitted by the opposed cam surfaces 117 of the cam plate. Similarly, it will be seen that movement of the hydraulic cylinder assembly 99 operates the lever arms 147 to pivot the control fingers 136 and 140 of the cage members upwardly or downwardly about the pivot pins 131 between first and second positions. Pivot pins 156 permit a loose movement during such pivoting of the cage members to permit such movement to be in rectilinear fashion along a second path. Consequently, the hooked remote ends 137 and 141 of the control fingers 136 and 140 of the same side of the feed housing are maintained in vertical alignment and the same spacing during such pivoting.

Each feed housing 37 has a pair of central finger assemblies 165 mounted individually on its opposite sides. Each control finger assembly includes a shaft 166 pivotally mounted on and extending between the bosses 44 of each pair on its respective side 43 of the feed housing. Each finger assembly mounts a second holding member central finger 167 extended from the shaft and having a hooked remote end 168. The remote ends of the central fingers of each feed housing are hooked to extend toward each other in alignment transversely of the guide passage 47. Pins 169 are individually affixed on and extended through the central fingers in corresponding locations. Each pin has a cam follower 170 secured on the upper portion thereof and adapted to engage the flared and recessed cam surfaces 62 and 63 respectively of the folding member 55 depending upon the specific position of the folding member relative to the cam followers. Each pin has a lower end 171. The lower ends 171 of the pins 169 are interconnected by a tension spring 172. The spring 172 retains the remote ends of the central fingers in the position shown in FIG. 5 until the folding member 55 is moved so that the cam followers 170 of the finger assemblies engage the recessed cam surfaces 63 in which case the remote ends 168 are moved toward each other from the position shown in FIG. 5. Because the folding member 55 and cam plate 116 of each feed housing 37 are fixed relative to each other, it will be seen that when the cam plate and folding member are in the position shown in FIG. 5, the central fingers are expanded from each other while the upper and lower control fingers 136 and 140 respectively are in positions closest to each other. Conversely when the folding member and cam plate are motivated to their advanced position to the left from the positions viewed in FIG. 5, the remote ends of the central control fingers are motivated to their closest positions while the remote ends of the upper and lower control fingers are motivated to positions farthest from each other.

Figure 3:
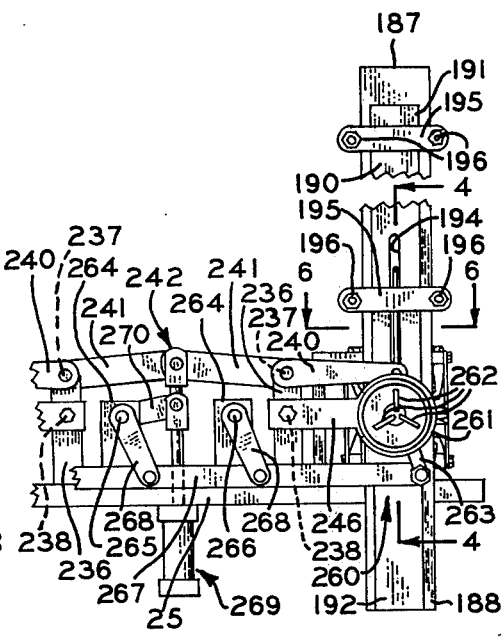
FIG. 3 is a fragmentary front elevation of a stuffing unit of the stuffing apparatus taken on line 3—3 in FIG. 1.

Each stuffing unit 34 mounts a magazine guide frame 180. Each guide frame includes a bracket 181 which is secured on the upper surface 41 of its respective feed housing 37 by a bolt 182, as best shown in FIG. 4. The bracket has an upper portion 183 which is flush with and extends vertically above the forward surface 38 of the feed housing. The forward portion has a slot 184 extending tansversely thereof facing in the direction of its respective stuffing station 17. A vertical plate 185 is borne on the bracket 181 in facing engagement with the upper portion 183 of the bracket and the forward surface 38 of the feed housing. The vertical plate extends across the recess 39 of the feed housing, as best shown in FIGS. 3 and 4. A plurality of cross pieces 186 are secured, as by welding, on the vertical plate extending transversely thereof. One of the cross pieces is received in the slot 184 of the bracket 181. The vertical plate has an upper end 187 above its respective feed housing and an opposite lower end 188 beneath the feed housing. A central passage 189 is provided in the vertical plate in axial alignment with the guide passage 47 of the feed housing.

Each magazine guide frame 180 has a guide plate 190. The guide plate has an upper end 191 and an opposite lower end 192. The guide plate has a central passage 193 which is in axial alignment with the guide passage 47 and the central passage 189 of the vertical plate 185. A vertical slot 194 extends longitudinally of the guide plate from a position in predetermined spaced relation to and above the central passage into communication with the central passage. A plurality of cross pieces 195 are borne by the guide plate. The guide plate is mounted on the vertical plate in parallel predetermined spaced relation by a plurality of nut and bolt assemblies 196 interconnecting the cross pieces 186 of the vertical plate and the cross pieces 195 of the guide plate so as to maintain the vertical and guide plates in the described positions relative to each other. The vertical plate and guide plate thus define a vertical passage 197 therebetween extending from the upper ends to the lower ends thereof normal to the axis of the guide passage.

Figures 8, 9, 10:
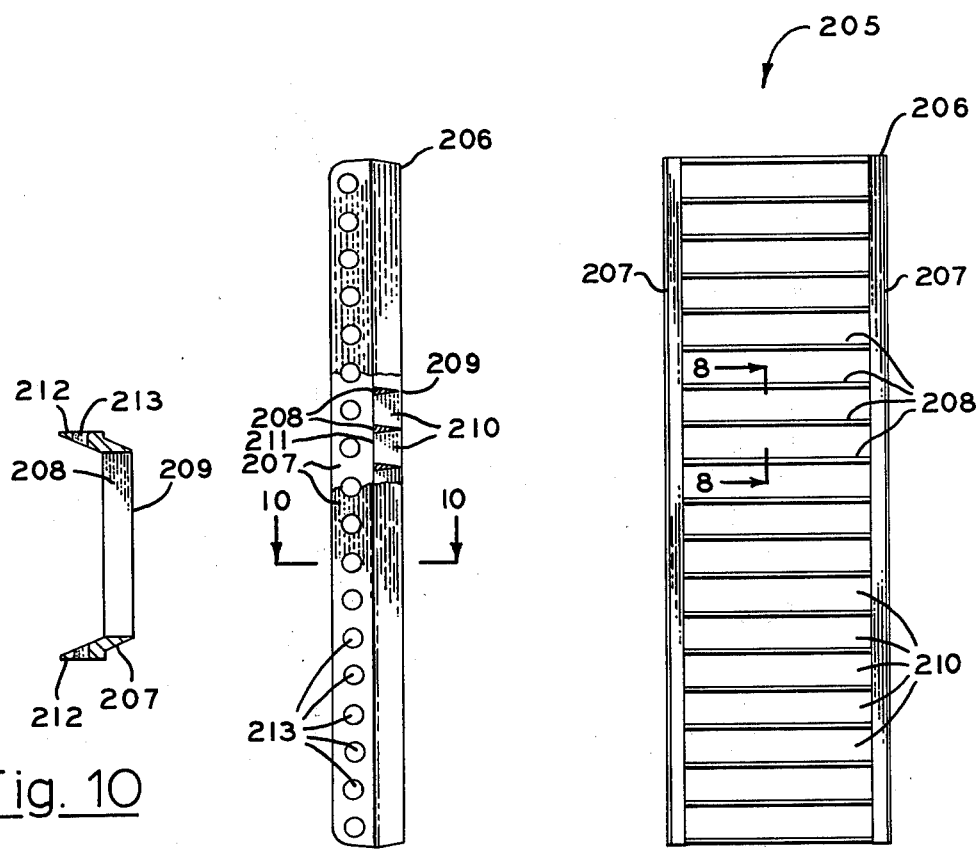
FIG. 8 is a fragmentary side elevation of the magazine of the stuffing apparatus.
FIG. 9 is a front elevation of the magazine of FIG. 8.
FIG. 10 is a transverse section taken on line 10—10 in FIG. 8.

Each magazine guide frame 180 is adapted to receive a plurality of magazines 205 stacked end to end within the vertical passage 197. As shown in FIGS. 8 through 10, each magazine has a frame 206 composed of a pair of spaced, substantially parallel longitudinal elements 207 interconnected by a plurality of transverse elements 208. The elements 207 and 208 have sharp edges 209 on a common side thereof. The transverse elements and longitudinal elements define a plurality of rectangular spaces or compartments 210. The transverse elements are shaped in cross section so as to define a narrow exit opening 211 for each rectangular space on the side of the frame opposite the sharp edges 209. A longitudinal flange 212 is borne by each longitudinal element 207 extending therefrom on the sides opposite their sharpened edges, as best shown in FIGS. 8 and 10. Each of the longitudinal flanges 212 has a plurality of openings 213 extended therethrough in predetermined positions.

Each magazine 205 is adapted to be loaded with a charge of stuffing material. Such loading of a magazine is accomplished by pressing the sharp edges 209 of the elements 207 and 208 into a mass of stuffing material disposed in a plane, as on a table not shown. The stuffing material can be of any suitable type and composition. Where it is desired to stuff olives with pimento, it has been found most convenient to intermix pimento with a gelatinous binding substance to form a flat sheet or mat of the material having a thickness approximately equal to the depth of the rectangular spaces 210. Pressing of the sharp edges into such a mat of material operates individually to fill the rectangular spaces 210 with segments 214 of stuffing material corresponding in size and thickness to their respective spaces 210 in the frame. The magazines 205 are deposited end to end in the vertical passage 197 of the magazine guide frames 180 with the flanges 212 extending on opposite sides of the guide plate 190, as best shown in FIG. 5. A trough 215 is borne by the pitting machine 11 beneath the lower ends 188 and 192 of each magazine guide frame to receive magazines 205 as they are discharged from the stuffing apparatus as will hereinafter be described.

Each magazine guide frame 180 mounts a folding wire assembly 220. Each folding wire assembly has a holder 221 which is slidably received in the vertical slot 194 of the guide plate 190 for movement between predetermined raised and lowered positions. A rigid linear member or wire 222 is secured in the holder for movement therewith in the slot 194. The wire has a grasping end portion 223, which is bent to extend outwardly from the guide plate, and an opposite folding end portion 224 which, when the holder is in the lowered position, extends through the central passage 193 of the guide plate 190, as best shown in FIGS. 4 and 5. A set screw 225 is secured on the holder and engages the wire so as to lock it in the preferred position in the holder. A pin 226 is mounted on the holder and extends outwardly therefrom, as best shown in FIG. 4.

The stuffing apparatus 10 has a wire positioning assembly 235. The wire positioning assembly has a pair of upstanding mounts 236 mounted on the base plate 25 in positions individually adjacent to the stuffing units 34. Each mount has an upper passage 237 and a lower passage 238 extending therethrough substantially parallel to the guide passage 47 of its respective feed housing 37. A shaft 239 is journaled for rotational movement in the upper passage of each mount. A front connecting arm 240 is affixed on the end of each shaft 240 nearest the stuffing station 17 for movement therewith and is connected at its remote end to the pin 226 of the holder 221 of its respective folding wire assembly 220. A rear connecting arm 241 is affixed on the opposite end of each shaft and extended therefrom toward the rear connecting arm of the other feed housing 37, as best shown in FIG. 1. A hydraulic cylinder assembly 242 is secured on the under side of the base plate 25 and extended upwardly through the plate. The hydraulic cylinder assembly is connected to the rear connecting arms 241 by a pivotal linkage 243. Thus, it will be seen that actuation of the hydraulic cylinder assembly 242 by the sequencing mechanism, not shown, operates to raise or lower the folding end portions 224 of the folding wire assemblies 220 through their interconnection by way of the connecting arms 240 and 241 with the hydraulic cylinder assembly 242.

A spring loaded slide shaft 245 is slidably received in the lower passage 238 of each mount. The slide shaft is spring loaded in its respective lower passage resiliently to retain the shaft in the retracted position shown in FIG. 1. A connecting arm 246 is borne by the end of each shaft nearest the stuffing station 17 and extends in right-angular relation thereto, as shown in FIG. 3. Each slide shaft has a strike end 247 remote from the connecting arm and in axial alignment with its respective adjustment member 121.

A forward housing 250 is borne by the guide plate 190 of each magazine guide frame 180 in covering relation to the central passage 193 of the guide plate, as best shown in FIGS. 4 and 5. The housing has an internal receptacle 251 communicating with the central passage 193 of the guide plate and in axial alignment with the guide passage 47 of the feed housing 37. A cylindrical barrel 252 is secured on the housing in axial alignment with the guide passage 47 and in communication with the receptacle 251 of the forward housing. The barrel has a beveled entrance opening 253 within the receptacle 251 of the forward housing.

The stuffing apparatus 10 has a dilator assembly 260 which is disclosed in and constitutes a part of the invention of the applicant's co-pending patent application entitled "Stuffing Apparatus". The dilator assembly constitutes no part of the claimed invention of the instant patent application and reference is made to the applicant's foregoing patent application for a full disclosure of the structure and operation of the dilator assembly. The dilator assembly 260 is shown and described herein only insofar as is necessary to understand the structure and operation of the stuffing apparatus 10 of the instant patent application.

The dilator assembly 260 has a dilator head 261 slidably received on the barrel 252 of each feed housing 37. Each dilator head is mounted on the remote end of the adjacent connecting arm 246 for movement along its respective barrel 252 by the connecting arm 246. The dilator head mounts a plurality of dilator fingers 262 which operate, as disclosed in the aforementioned co-pending patent application to dilate the opening of an olive 15 received in the stuffing station 17. Each dilator head mounts a lever arm 263 which is moved to control movement of the dilator fingers 262 toward and from each other. A pair of shaft mounts 264 are mounted on the base plate 25 of the stuffing apparatus 10 in predetermined spaced relation. A main shaft 265 is rotationally received in one of the shaft mounts and an idler shaft 266 is rotationally received in the other shaft mount. A cross arm 267 interconnects the lever arms 263 of the dilator heads 261 of the stuffing units 34. A pair of linking arms 268 are individually secured on the shafts 265 and 266 for movement therewith. The linking arms are individually pivotally connected to the cross arm 267, as best shown in FIG. 3. A hydraulic cylinder assembly 269 is secured on the under side of the base plate 25 and extended therethrough. A connecting arm 270 is fastened on the rearwardly extending end of the main shaft 265 and pivotally interconnected with the upper end of the hydraulic cylinder assembly 269, as best shown in FIG. 3. It will be seen that operation of the hydraulic cylinder assembly 269 as controlled by the sequencing mechanism, not shown, operates through the linking arms 268 and cross arm 267 simultaneously to operate the dilator fingers 262 of the dilator heads 261.

OPERATION

Operation of the described embodiment and the subject invention is believed to be clearly apparent and is briefly summarized at this point. With the magazines 205 loaded with segments 214 of stuffing material, the magazines are deposited endwardly in the vertical passage 197 of each of the magazine guide frames 180 of the stuffing apparatus. The magazines are oriented, as previously described, with the longitudinal flanges 212 extending about the sides of the guide plate 190.

The operative components of the stuffing apparatus 10 are, at this time, arranged with respect to each other, as shown in FIG. 5. For illustrative convenience, the operation of one of the stuffing units 34 is described herein. It will be understood that the operations described occur simultaneously in both stuffing units. The remote ends 137 and 141 of the upper and lower control fingers 136 and 140 respectively are received in the openings 213 of the longitudinal flanges 212 of the lowermost magazine 205 to retain it in position in the guide frame 180. This positions one of the rectangular spaces 210 of that magazine with the segment 214 of stuffing material therewithin in axial alignment with the guide passage 47 of the feed head, as best shown in FIG. 5. At this time the central control fingers 167 are retracted from the openings 213. Similarly, the folding member 55, plunger 70 and dilator head 261 are retracted as shown in FIG. 5. The folding end portion 224 of the folding wire assembly 220 is in the lowered position extending across the central passage 193 of the guide plate. The sequencing mechanism, not shown, of the pitting machine 11 operates the index wheel 13 and punch assemblies 14 to deliver a pitted olive 15 into the stuffing station 17 oriented as shown in FIGS. 1 and 2.

Figure 7:
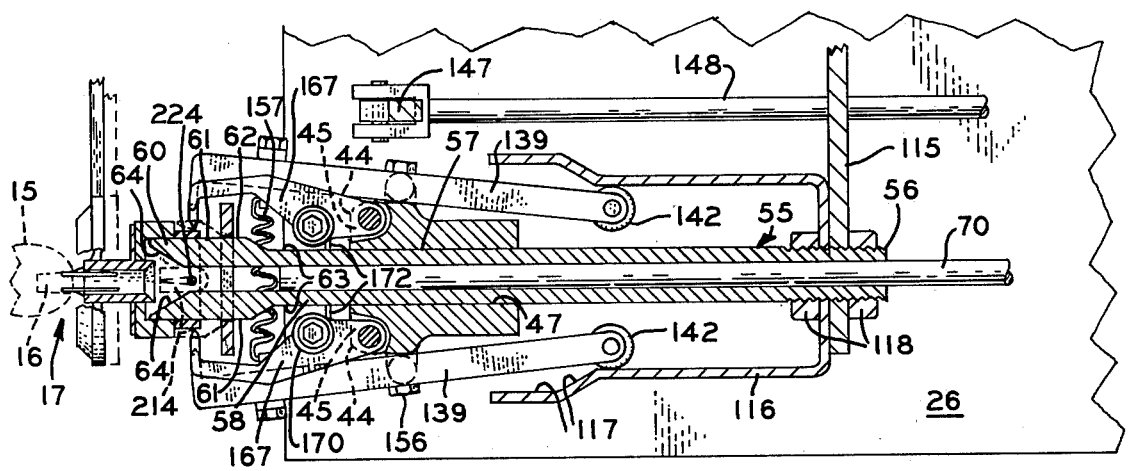
FIG. 7 is a fragmentary horizontal section of the stuffing unit showing its operable configuration prior to forward movement of the plunger and the folding member in the advanced position.

With the stuffing unit 34 set up as described, the sequencing mechanism operates the hydraulic cylinder assembly 109 to move the cross bar 115 and cam plates 116 to the left, as viewed in FIGS. 1 and 2. The folding member 55 is thus moved forwardly in the guide passage 47 so that the flattened forked portion 58 thereof slides through the space 210 of the magazine 205 to fold the segment 214 of stuffing material thereagainst and about the folding end portion 224 of the wire 222. The forked portion of the folding member folds the segment transversely about the wire and into a flat configuration in juxtaposed alignment with the barrel 252 of the forward housing 250, as shown in FIG. 7.

Simultaneously with the forward movement of the folding member 55, the central fingers 167 are permitted, under tension of the spring 172 and engagement of the cam followers 170 with the cam surfaces 62 and subsequently 63 of the folding member to move toward each other and insert their remote ends 168 in corresponding openings 213 of the magazine. Instantaneously after receipt of the remote ends of the central fingers in the openings of the magazine, movement of the cam plates in engagement with the cam followers 142 causes the upper and lower control fingers 136 and 140 respectively to be drawn from each other to remove the remote ends 137 and 141 respectively thereof from the openings 213 of the magazine. Continued forward movement of the cross bar 115 causes the stop ends 122 of the adjustment members 121 to be brought into engagement with the strike ends 247 of the slide shafts 245 and carry them forwardly against spring pressure toward the stuffing stations. The dilator heads 261 are carried as a result of such movement into engagement with their respective olives 15 in the stuffing stations 17. Each olive is thus captured in the stuffing station between the index wheel and dilator head. Thereafter, the sequencing mechanism operates the hydraulic cylinder assembly 269 to move the dilator fingers 262 of the dilator heads from their retracted positions to their expanded positions thereby expanding the cavities of the olives in the stuffing stations 17 for the subsequent receipt of the segments 214 of the stuffing material.

The wire positioning assembly 235 is then operated through the sequencing mechanism's operation of the hydraulic cylinder 241 to raise the folding end portion 224 of the wire 222 out of the folded segment 214 and from the central passage 193 of the stuffing unit 34. The segment 214 is thus left in folded relation between the prongs 60 of the folding member 55 in juxtaposition to the barrel 252.

Subsequently, the sequencing mechanism operates the hydraulic cylinder assembly 88 to rotate to the main shaft 83 and carry the plungers 70 of the respective stuffing units 34 through the longitudinal passages 59 of the folding members 55 toward their respective stuffing stations 17. Consequently, the work end 72 of each plunger is carried into contact with the segment 214 and transports it through the beveled entrance opening 253 of the barrel 252 and through the barrel into the cavity of the olive 15 within the stuffing station. As the plunger is advanced toward the cavity of the olive, the pitting apparatus 11 retracts the punch assembly of that olive leaving the cavity free for receipt of the segment. The olive is thus stuffed with the segment and has a pleasing appearance as a result of the smooth rounded back of the fold of the segment being disposed in outwardly facing relation in the cavity.

Subsequently, the cylinder assembly 88 is operated in the reverse direction to retract the plunger 70 of each stuffing unit 34 to the position shown in FIG. 5. After retraction of the plungers, the hydraulic cylinder assembly 269 is operated to cause the dilator fingers 262 to be moved toward each other to return the cavities of the olives to the undilated configuration and capturing the segment in the cavity. The hydraulic cylinder assembly 109 is then operated in the reverse direction to retract the cross bar 115. The resulting movement of the adjustment members to the right, as viewed in FIG. 1, permits the spring loaded slide shafts 245 to be retracted under spring pressure. The dilator heads 261 are thus retracted from engagement with the olives 15. The olives, thus released from engagement between the index wheels and dilator heads are permitted to fall gravitationally for collection therebelow for subsequent packing or canning.

The magazine 205 is, at this point, held only by the central fingers 167, as previously discussed. The sequencing mechanism operates the hydraulic cylinder assembly 99 to pivot the cage assemblies 130 of the stuffing units 34 by way of the outer sleeve 95 and adjustable linking assemblies 148. The cage assemblies are pivoted so as to raise the upper and lower control fingers 136 and 140 upwardly into juxtaposition with the next set of openings 213 of the magazine 205. As the folding members 55 are retracted with the cross bar 115, the cam surfaces 62 and 63 of the folding member 55 again cause the central fingers to be moved out of their respective openings 213 of the magazine. Immediately thereafter the retracting cam plates 116 permit the upper and lower control fingers 136 and 140 again to move toward each other and the remote ends 137 and 141 respectively thereof are received in the next set of openings 213 of the magazine.

Subsequently, the cylinder assembly 99 is operated in the opposite direction to pivot the cage assemblies 130 in the opposite direction thereby lowering the upper and lower control fingers 136 and 140 to the positions shown in FIG. 2. The magazine 205 is carried with the upper and lower control fingers. This indexes the magazine downwardly one increment and positions a new segment 214 of stuffing material in axial alignment with the guide passage 47 of the stuffing unit 34.

After retraction of the folding members 55 and plungers 70 to the positions shown in FIG. 5, the wire positioning assembly 235 is operated by cylinder assembly 242 to lower the folding end portions 224 of the wires 222 to the lowered position shown in FIGS. 4 and 5.

With the repositioning of the magazine, one cycle of operation of the stuffing apparatus 10 is completed. The cycle is, of course, repeated extremely rapidly during normal operation of the stuffing apparatus to stuff olives in the stuffing station.

The cooperative interaction of the various operative features of the stuffing apparatus 10 of the present invention achieves a simplified construction which insures a dependability of operation at extremely high operating speeds with little maintenance and little or no incidence of breakdown. The use of magazines containing segments of stuffing material eliminates the problem of stuffing material being difficult to handle and minimize the problems of jamming as a result of the collection of residue from the stuffing material. Furthermore, the use of the magazines in the stuffing apparatus assists in permitting the apparatus to operate at high speed.

Therefore, the stuffing apparatus of the present invention achieves a considerable improvement over the art in the stuffing of olives and the like on a commercial basis in an apparatus which is adaptable for use on a wide variety of types of pitting machines operating with a dependability and efficiency heretofore unknown in the art.

Although the invention has been herein shown and described in what is conceived to be the most practical and preferred embodiment, it is recognized that departures may be made therefrom within the scope of the invention, which is not to be limited to the illustrative details disclosed.

Having described my invention what I claim as new and desire to secure by Letters Patent is:

1. An apparatus for stuffing olives and the like, the apparatus comprising means for successively delivering said olives to a stuffing station in alignment with a predetermined path of movement; means for retaining material to be stuffed in the path of movement; a rigid member disposed between the olive in the stuffing station and said material; a folding member; a plunger; means mounting said folding member and plunger for individual movement along the path of movement; means connected to the folding member for moving the folding member along the path of movement to fold the material about the rigid member; means connected to the rigid member for removing the rigid member from the folded material; and means connected to the plunger for moving said plunger along the path of movement to stuff the folded material into the olive in the stuffing station.

2. The apparatus of claim 1 wherein said folding member and plunger are received in the path of movement for substantially coaxial movement relative to each other along said path, the folding member has portions which pass on opposite sides of the rigid member to fold the material about the member and the plunger has a portion which passes between said portions of the folding member to move said folded material therefrom into the olive subsequent to said removal of the rigid member.

3. The apparatus of claim 1 wherein the retaining means includes a magazine having a plurality of compartments individually retaining discrete segments of said material for stuffing and the apparatus includes means for indexing the magazine transversely of said path of movement to position one of the compartments and the segment thereof in said path of movement prior to the stuffing of an olive in the stuffing station.

4. The apparatus of claim 3 wherein the indexing means includes first and second pairs of holding members borne by the apparatus for individual movement to and from engagement with the magazine, said first pair is movable between first and second positions along a second path substantially transversely of said path of movement and operating means are connected to the first and second pairs of holding members for individually operating said first and second pairs after the stuffing of an olive in the stuffing station to move said second pair into engagement with the magazine, to move said first pair along said second path from engagement with the magazine in the first position and into engagement with the magazine in the second position, to move said second pair from the magazine and to return said first pair while in engagement with the magazine to the first position to dispose a successive compartment containing a segment in the path of movement.

5. The apparatus of claim 4 wherein said operating means includes resilient means individually resiliently retaining said first and second pairs in engagement with the magazine and wherein the folding member is movable along the path of movement between retracted and extended positions, the folding member has a cam surface in engagement with the second pair in the retracted position to release the second pair from the magazine, a pair of cam plates are borne by the apparatus for movement with said folding member and engagement with said first pair in the extended position to release the first pair from the magazine.

6. An apparatus for stuffing olives and the like comprising means for successively delivering such olives to a stuffing station in alignment with a predetemined axis; means for delivering successive charges of stuffing material to the axis; a rigid member disposed between the stuffing station and said material; a folding member; a plunger; means mounting said folding member and plunger for individual reciprocal movement along the axis toward and from the stuffing station; means for moving the folding member along the axis to fold the material about the rigid member upon delivery of an olive to the station and a charge of stuffing material to the axis; means connected to the rigid member for withdrawing said rigid member from the folded material; and means connected to the plunger for moving said plunger along the axis toward the station to stuff the folded material into the olive.

7. In a machine for stuffing objects in a stuffing station having a mechanism for successively delivering said objects to the stuffing station and a plunger borne by the machine for movement along a predetermined path to and from the stuffing station, an improvement comprising a frame containing discrete segments of material successively to be stuffed in said objects; indexing fingers; means mounting said fingers on the machine for discriminate engagement with the frame and movement of selected fingers along a path substantially transversely of said path of the plunger; plunger drive means connected in driving relation to the plunger for moving the plunger in successive cycles of operation along the path through the frame successively, individually to stuff said segments in objects in the stuffing station; and means for discriminately moving said indexing fingers to move the frame in increments of stepped progression transversely of said path of the plunger to position a segment of the frame in said path of the plunger prior to each of said cycles.

8. The improvement of claim 7 wherein a linear member is borne by the machine between the stuffing station and the frame extending substantially transversely of said path of the plunger, a forked folding member is slidably received on the plunger for individual movement along said path of the plunger, means is connected to the forked folding member for moving said folding member through the frame to fold a segment about said linear member, and means is connected to the linear member for retracting the linear member from the segment so folded prior to each of said cycles of movement of the plunger.

* * * * *